(12) United States Patent
Shinno et al.

(10) Patent No.: US 10,360,896 B2
(45) Date of Patent: Jul. 23, 2019

(54) VEHICLE NOISE CANCELLER

(71) Applicant: SUBARU CORPORATION, Tokyo (JP)

(72) Inventors: Katsuya Shinno, Tokyo (JP); Masahiko Sato, Tokyo (JP); Atsushi Horikawa, Tokyo (JP); Shinji Nakabayashi, Tokyo (JP); Shintaro Hanawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/908,649

(22) Filed: Feb. 28, 2018

(65) Prior Publication Data

US 2018/0286378 A1    Oct. 4, 2018

(30) Foreign Application Priority Data

Mar. 30, 2017   (JP) .................. 2017-067354

(51) Int. Cl.
| | |
|---|---|
| *G10K 11/178* | (2006.01) |
| *G06T 7/593* | (2017.01) |
| *G06K 9/00* | (2006.01) |
| *B60Q 5/00* | (2006.01) |
| *B60R 16/037* | (2006.01) |

(52) U.S. Cl.
CPC .......... *G10K 11/17881* (2018.01); *B60Q 5/00* (2013.01); *G06K 9/00791* (2013.01); *G06T 7/593* (2017.01); *G10K 11/17823* (2018.01); *G10K 11/17825* (2018.01); *G10K 11/17883* (2018.01); *B60R 16/037* (2013.01); *G06T 2207/30252* (2013.01);

(Continued)

(58) Field of Classification Search
None
See application file for complete search history.

(56) References Cited

U.S. PATENT DOCUMENTS

| | | | | |
|---|---|---|---|---|
| 2013/0103259 A1* | 4/2013 | Eng | ...................... | B60G 17/019 701/37 |
| 2013/0315409 A1* | 11/2013 | Inoue | ............... | G10K 11/17833 381/71.1 |

(Continued)

FOREIGN PATENT DOCUMENTS

| | | |
|---|---|---|
| JP | H 07-028474 A | 1/1995 |
| JP | H 10-169700 A | 6/1998 |

(Continued)

OTHER PUBLICATIONS

Japanese Office Action dated Jul. 31, 2018 in Japanese Application No. 2017-067354 with an English translation thereof.

*Primary Examiner* — Antim G Shah

(74) *Attorney, Agent, or Firm* — McGinn I.P. Law Group, PLLC

(57) ABSTRACT

A vehicle noise canceller includes a road surface condition observation unit, a speaker, and an operation controller. The road surface condition observation unit is configured to observe road surface conditions in a traveling direction of a vehicle. The speaker is configured to generate a canceling sound for canceling road noise entering a vehicle cabin of the vehicle. The operation controller is configured to control the canceling sound generated from the speaker on a basis of information received from the road surface condition observation unit.

14 Claims, 3 Drawing Sheets

(52) U.S. Cl.
  CPC ........... *G10K 2210/12821* (2013.01); *G10K 2210/3011* (2013.01); *G10K 2210/3044* (2013.01)

(56) References Cited

U.S. PATENT DOCUMENTS

| | | | |
|---|---|---|---|
| 2015/0269925 A1 | 9/2015 | Kanaya | |
| 2016/0001780 A1* | 1/2016 | Lee | G06K 9/00791 701/48 |

FOREIGN PATENT DOCUMENTS

| | | |
|---|---|---|
| JP | 2003-216163 A | 7/2003 |
| JP | 2007-079386 A | 3/2007 |
| JP | 2015-179194 A | 10/2015 |

\* cited by examiner

VEHICLE NOISE CANCELLER

CROSS-REFERENCE TO RELATED APPLICATIONS

The present application claims priority from Japanese Patent Application No. 2017-067351 filed on Mar. 30, 2017, the entire contents of which are hereby incorporated by reference.

BACKGROUND

1. Technical Field

The present invention relates to a vehicle noise canceller, and more particularly to a vehicle noise canceller capable of improving a function of canceling noise by observing road surface conditions in front of a vehicle.

2. Related Art

When a vehicle travels on a road surface, road noise occurs as a result of an uneven condition of a road surface. If a part of the road noise intrudes into the vehicle cabin, the comfort of an occupant in the vehicle cabin is compromised and, furthermore, the quality of the auditory listening experience in the vehicle compartment may be degraded.

Therefore, road noise cancellation has been introduced in which a canceling sound is generated from a speaker provided in a vehicle and cancels the road noise entering the vehicle cabin.

An example of road noise cancellation is described in Japanese Unexamined Patent Application Publication (JP-A) No. 7-28474. Specifically, an acceleration sensor for detecting vehicle body vibration is provided with the vehicle suspension, signals are weighted based on the output from the acceleration sensor, and by using reference signals obtained by this weighting and a synthesized sound signal, a noise-canceling signal is outputted into the vehicle cabin. In this manner, a canceling sound based on the noise-canceling signal optimized according to the road surface condition is generated in the vehicle cabin and the road noise is reduced.

However, the road noise cancellation which adjusts the noise-canceling signal with the acceleration sensor disposed to the above-mentioned vehicle has a problem in that it is not always possible to cancel the road noise that intrudes into the vehicle cabin.

Specifically, if a canceling sound generated based on the output of an sensor such as provided with the suspension of the vehicle is generated from a speaker provided in the vehicle cabin, the road noise and the cancel sound may not be matched in time. Specifically, a predetermined period of time is required to convert the impact, being generated from the unevenness of the road surface by the acceleration sensor, into an electric signal, and perform a calculation. Therefore, with respect to the timing in which road noise occurs from the vehicle just passing over an uneven road surface, the time at which a canceling sound is generated to cancel the road noise is delayed. Therefore, canceling of the road noise with the canceling sound is not effectively performed. That is, there is a concern that noise cancellation would make an occupant aboard the vehicle sense something uncomfortable in their hearing.

SUMMARY OF THE INVENTION

It is desirable to provide a vehicle noise canceller in which the noise-canceling function is improved by adjusting the canceling sound according to the road surface conditions in front of the vehicle.

An aspect of the present invention provides a vehicle noise canceller including a road surface condition observation unit configured to observe road surface conditions in a traveling direction of a vehicle, a speaker configured to generate a canceling sound for canceling road noise entering a vehicle cabin of the vehicle, and an operation controller configured to control the canceling sound generated from the speaker on a basis of information received from the road surface condition observation unit.

BRIEF DESCRIPTION OF THE DRAWINGS

FIG. 1A is a side view illustrating a situation in which a vehicle provided with the vehicle noise canceller travels on a road surface. FIG. 1B is a block diagram illustrating a configuration of connections of the vehicle noise canceller.

DETAILED DESCRIPTION

Figure 1A:
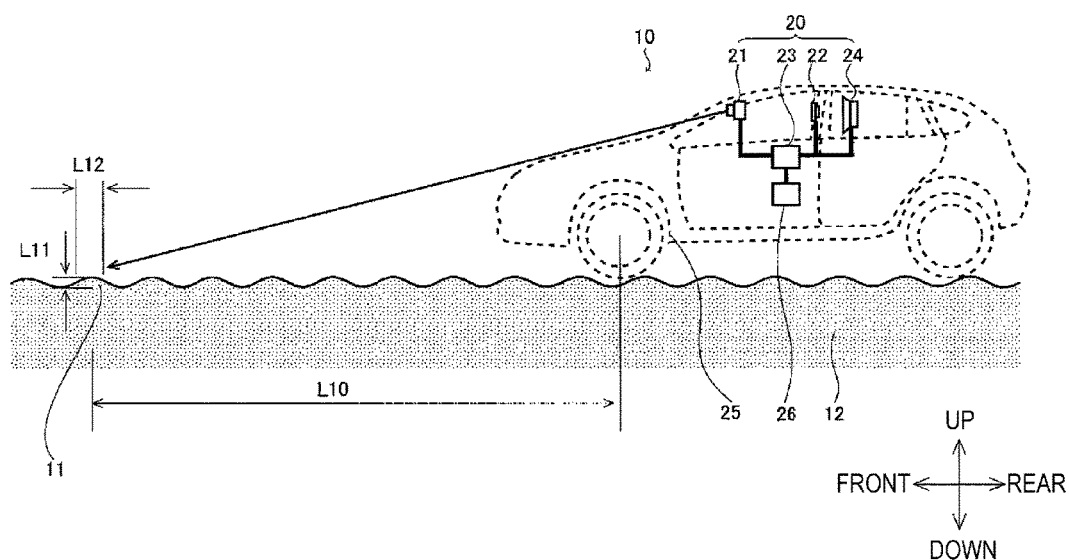
FIGS. 1A-1B are views illustrating a vehicle noise canceller according to an example of the present invention.

Hereinafter, a vehicle noise canceller 20 according to an example of the present invention is described in detail with reference to the drawings. In the following description, as a general rule, the same reference numerals are used for the same members and redundant explanations are omitted.

Figure 1B:
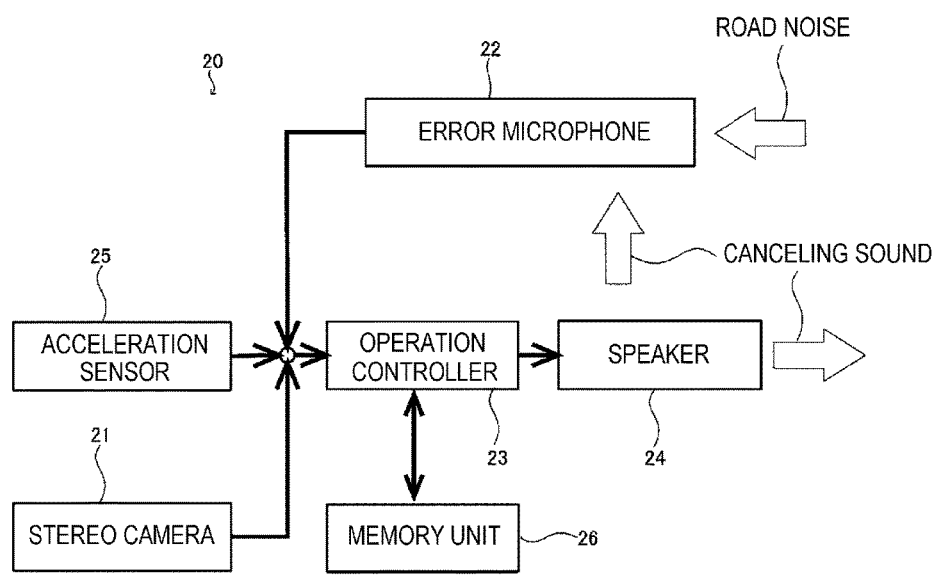

With reference to FIGS. 1A-1B, a configuration of the vehicle noise canceller 20 according to the present example is described. FIG. 1A is a side view illustrating a situation in which a vehicle 10 provided with the vehicle noise canceller 20 travels on a road surface 12, and FIG. 1B is a block diagram illustrating a configuration of connections of the vehicle noise canceller 20.

With reference to FIG. 1A, the vehicle noise canceller 20 includes an operation controller 23, a stereo camera 21, an error microphone 22, an acceleration sensor 23, and a memory unit 26. The function of the vehicle noise canceller 20, provided in a passenger vehicle 10 or the like, is to cancel road noise that enters a vehicle cabin of the vehicle 10. By adopting the vehicle noise canceller 20, the vehicle cabin 10 is made quiet and, furthermore, the acoustical characteristics of an audio device may be improved. The function of such a vehicle noise canceller 20 is also referred to as road noise cancellation (NRC).

The stereo camera 21 is a road surface condition observation unit for observing the conditions of the road surface 12 in the traveling direction of the vehicle 10. Specifically, the stereo camera 21 includes two imaging devices disposed to the vicinity of the front end of the vehicle cabin interior of the vehicle 10. Image data captured by the stereo camera 21 is transmitted to the operation controller 23. By adopting the stereo camera 21, it is possible to visually recognize the shape and size of a road surface irregularity 11 on the road surface 12 in front of the vehicle 10 as described later.

Furthermore, from the plurality of images obtained by the stereo camera 21, a distance L10 from the road surface irregularity 11 to the tire of the vehicle 10 is calculated by the controller 23.

In the following description, the shape and size of the road surface irregularity 11 may be referred to as an uneven condition. The uneven condition of the road surface 12 is determined by a height L11 and a width L12 of the road surface irregularity 11. That is, if the height L11 of the road surface irregularity 11 is large and the width L12 is narrow, the road surface 12 is judged to have a rough road surface, and a large road noise occurs. On the other hand, if the height L11 of the road surface irregularity 11 is small and the width L12 is wide, the road surface 12 is judged to have a smooth road surface, and the road noise decreases.

The stereo camera 21 also functions as a device for enhancing the traveling safety of the vehicle 10. Specifically, the stereo camera 21 is constantly capturing the front image of the vehicle 10 while the vehicle 10 is traveling. When the operation controller 23 finds an obstacle or the like in front of the vehicle 10 within a predetermined distance based on the images captured by the stereo camera 21, the operation controller 23 informs an occupant of the obstacle etc. by voice or the like, and the vehicle 10 is stopped by a braking device.

There are ways other than the stereo camera 21 that may be adopted as the road surface condition observation unit. For instance, a radar device can be adopted as a road surface condition observation unit. In the case where the radar device is adopted as the road surface condition observation unit, radio waves are generated from the radar device toward the front of the vehicle and by receiving the reflected waves from the road surface 12 with the radar device, the uneven condition of the road surface irregularity 11 on the road surface 12 and the distance L10 from the road surface irregularity 11 to the tire of the vehicle 10 are calculated. Furthermore, it is also possible to adopt both the stereo camera 21 and the radar device as the road surface condition observation unit.

The acceleration sensor 25 is disposed to the vehicle 10, measures the acceleration acting on the vehicle 10, and transmits an electric signal corresponding to the magnitude of acceleration to the operation controller 23.

The operation controller 23 is a CPU (Central Processing Unit) which performs a predetermined operation process based on information received from the stereo camera 21, the acceleration sensor 25, the memory unit 26, the error microphone 22, etc., and generates the canceling sound from a speaker 24. The operation controller 23 is configured as a part of the function of an ECU (Electronic Control Unit).

The memory unit 26 includes RAM (Random Access Memory) and ROM (Read Only Memory), and stores a program for operating the vehicle noise canceller 20, a noise-canceling database 27 to be described later, various functions, parameters, and the like.

The speaker 24, for instance, constitutes an audio system provided in the vehicle 10, and emits sounds of music or television programs into the vehicle cabin along with generating a canceling sound for canceling road noise entering the vehicle cabin. By generating a canceling sound from the speaker 24 of the audio system, the cost of configuring the vehicle noise canceller 20 is reduced. Here, in order to more effectively generate the canceling sound, an individual speaker may be provided in the vehicle 10 for generating the canceling sound.

The error microphone 22 is a microphone disposed in the vehicle cabin for feedback control. Specifically, the error microphone 22 collects the road noise and the canceling sound generated from the speaker 24 in the vicinity of the location where the ear of an occupant riding on the vehicle 10 is disposed. The error microphone 22 transfers the electrical signal indicating the road noise and the electrical signal indicating the canceling sound to the operation controller 23. Based on these electrical signals received from the error microphone 22, the operation controller 23 optimizes the frequency of the canceling sound, the sound pressure thereof, and the phase difference between the canceling sound and the road noise.

Figure 2:
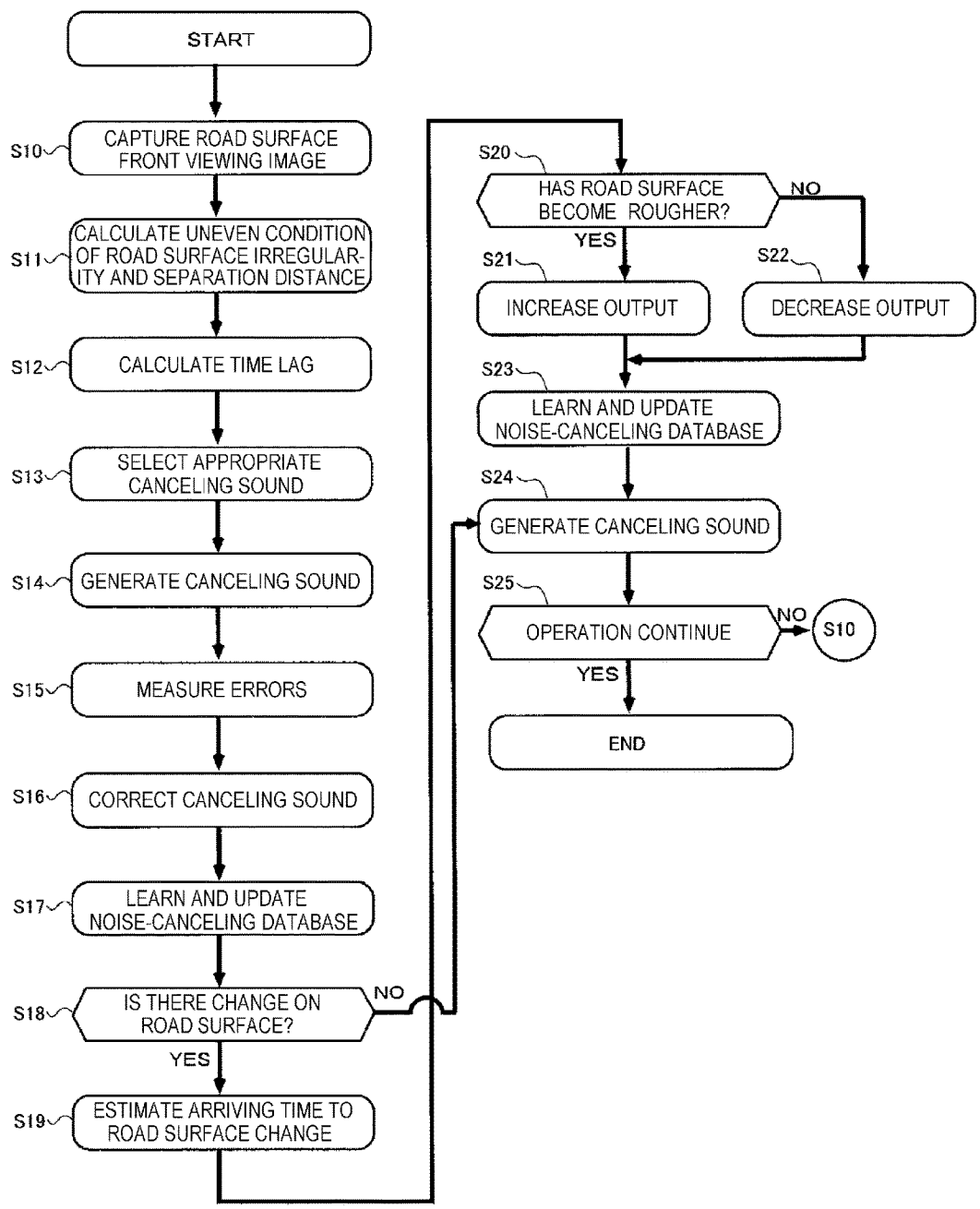
FIG. 2 is a view illustrating the vehicle noise canceller according to an example of the present invention and is a flowchart illustrating a canceling method for canceling road noise while a vehicle is traveling.

Based on the flowchart of FIG. 2, a method of noise canceling the road noise in the vehicle cabin using the vehicle noise canceller 20 having the above-described configuration is described with reference to FIG. 1A-1B described above. In the road noise-canceling method described here, the uneven condition of the road surface irregularity 11 of the road surface 12 and a separation distance L10 are measured by the stereo camera 21, and since the operation controller 23 takes into account the uneven condition and the separation distance L10, the noise cancellation can be timely performed so that the noise-canceling is made more effectively. By using the image data captured by the stereo camera 21, the calculation controller 23 can update the noise-canceling database 27 and further improve the noise-canceling effect.

In step S10, an image of the road surface 12 in front of the vehicle 10 is captured. Specifically, referring to FIG. 1A, by capturing a front viewing image of the vehicle 10 with the stereo camera 21 provided in the vehicle 10, the road surface irregularity 11 on the surface of the road surface 12 is captured and the captured image data is transmitted to the operation controller 23.

In step S11, the operation controller 23 calculates the uneven condition of the road surface irregularity 11 and the distance L10 from the road surface irregularity 11 to the vehicle 10 from the image data captured by the stereo camera 21. Since a plurality of image data having different viewpoints can be obtained from the stereo camera 21, the operation controller 23 accurately calculates the unevenness of the road surface irregularity 11, that is, the height and the horizontal size of the road surface irregularity 11. Further, the operation controller 23 accurately calculates the distance L10 from a plurality of image data.

In step S12, the operation controller 23 calculates the time lag from when an image of the road surface irregularity 11 is captured by the stereo camera 21 to when the tire of the vehicle 10 will come into contact with the road surface irregularity 11 and road noise enters the vehicle cabin. Specifically, the operation controller 23 can calculate the vehicle speed of the vehicle 10 from the number of revolutions of the tire or the like, and calculate the time lag, for instance, by dividing the distance L10 by the vehicle speed.

In step S13, the operation controller 23 selects an appropriate canceling sound based on the image data obtained by the stereo camera 21.

Figure 3:
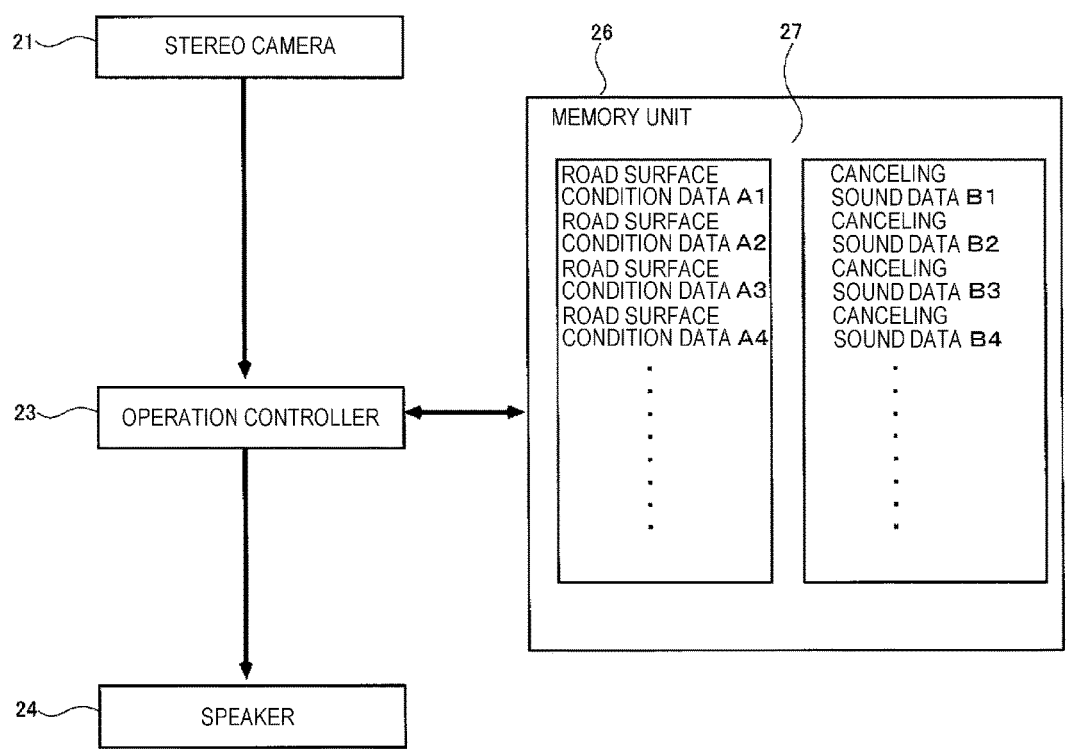
FIG. 3 is a view illustrating the vehicle noise canceller according to an example of the present invention and illustrates a noise-canceling database used in the example.

Specifically, referring to FIG. 3, the noise-canceling database 27 used for canceling the noise includes road surface condition data and canceling sound data, and is stored in the memory unit 26. The road surface condition data includes road surface condition data, such as A1, A2, A3, A4 . . . , prepared in accordance with various road surface conditions. In addition, the canceling sound data includes canceling sound data, such as B1, B2, B3, B4, . . . , corresponding to the road surface condition data A1 and the like. Furthermore, the noise-canceling database 27 may include time information indicating the time lag from the measurement of the road surface 12 by the stereo camera 21 to the generation of the canceling sound by the speaker 24. In this case, the time lag may be updated based on the measurement of the error in step S15 so that the error becomes small.

The road surface condition data A1 or the like may be the image of the road surface irregularity 11 captured by the stereo camera 21, a part of the image, an image processed from these, or numeric values indicating the uneven conditions of the road surface irregularity 11. The canceling sound data B1 or the like are data indicating the frequency of the canceling sound, sound pressure, or the like. For instance, when a canceling sound based on the canceling sound data 131 is generated from the speaker 24, it is possible to adequately cancel the road noise in the vehicle cabin when the vehicle 10 travels on the road surface 12 in the road surface condition indicated by the road surface condition data A1. Since the road noise generated differs depending on the type of the vehicle 10, the noise-canceling databases 27 is provided with different information for each type of vehicles and stored in the memory unit 26.

In the case where the vehicle 10 is a new vehicle, the noise-canceling database 27 described above is stored and prepared in the memory unit 26 in advance. Furthermore, in the present example, as is described later, the noise-canceling database 27 stored in the memory unit 26 can be updated by learning, and in this way, the canceling sound is generated in accordance with the uneven condition of the road surface 12 on which the vehicle 10 routinely passes over, and the road noise can be canceled more effectively.

In this step S13, the operation controller 23 selects the road surface condition data (for instance, road surface condition data A3) that is closest to the uneven condition of the road surface irregularity 11 from the images captured by the stereo camera 21, and uses the canceling sound data corresponding to the road surface data (for instance, canceling sound data B3) as the optimal canceling sound data.

Here, in step S13, the operation controller 23 can also generate canceling sound data by taking into account not only the input information from the stereo camera 21 but also the information on acceleration received from the acceleration sensor 25. In this way, the operation controller 23 can assess the uneven condition of the road surface 12 more accurately and generate more appropriate canceling sound data.

In step S14, the operation controller 23 generates a canceling sound from the speaker 24. Specifically, the operation controller 23 generates a canceling sound from speaker 24 based on the canceling sound data selected in step 13 when the time lag calculated in step 12 has passed after capturing the image of the road surface 12 in step 10. In this way, the road noise that is generated by contact of the tire of the vehicle 10 with the road surface irregularity 11 and intrudes into the vehicle cabin is canceled out by the canceling sound generated from the speaker 24 so that the noise in the vehicle cabin is reduced.

In steps S15 and S16, errors are measured, and the canceling sound is corrected based on the errors. Specifically, the above-mentioned road noise and canceling sound are collected by the error microphone 22, and the operation controller 23 measures the errors by comparing the road noise and the canceling sound from aspects of frequency, sound pressure, phase difference so as to detect the errors. Furthermore, the operation controller 23 corrects the frequency, the sound pressure, and the phase difference of the canceling sound so as to reduce these errors. Furthermore, the operation controller 23 measures the time difference between the road noise and the canceling sound and adjusts the time at which the speaker 24 generates the canceling sound in a way such that the time difference becomes small.

In step S17, the operation controller 23 learns and updates the noise-canceling database 27 based on the above-described correction result. For instance, the operation controller 23 can perform the updating by correcting or appending data to the noise-canceling database 27 based on the corrections obtained in steps S15 and S16. When correcting, the operation controller 23 replaces the canceling sound data before correction with the canceling sound data after correction. Also, when appending is performed, the operation controller 23 appends the corrected canceling sound data to the noise-canceling database 27 together with the corresponding road surface condition data. In this way, the noise-canceling database 27 is made suitable for the road surface 12 on which the vehicle 10 actually travels, and the road noise generated by traveling on the road surface 12 is effectively canceled by using the noise-canceling database 27.

In step S18, it is judged whether there is a change in the road surface condition of the road surface 12. Specifically, the operation controller 23 constantly measures uneven conditions of the road surface 12 by capturing the image of the road surface 12 in front of the vehicle 10 with the stereo camera 21. Then, when the variation in the uneven conditions of the road surface 12 becomes equal to or greater than a predetermined amount, that is, if step S18 is YES, learning and updating of the noise-canceling database 27 are performed along with adjustment of the canceling sound with the method described below. For instance, referring to FIG. 1A, if the height L11 of the road surface irregularity 11 becomes larger than a predetermined height, it is judged that the uneven condition of the road surface 12 has changed to the predetermined amount or more. Further, if the width L12 of the road surface irregularity 11 becomes smaller than a predetermined value, it is judged that the uneven condition of the road surface 12 has changed to the predetermined amount or more. On the other hand, if the amount of change in the uneven condition of the road surface 12 is less than the predetermined amount, that is, if step S18 is NO, adjustment of the canceling sound is not performed, and the process proceeds to step S24.

In step S19, the operation controller 23 estimates an arriving time to the road surface irregularity 11 of the road surface 12 where the uneven condition has changed comes in contact with the tire of the vehicle 10. This time is calculated by calculating the distance L10 from the tire of the vehicle 10 to the road surface irregularity 11 with the stereo camera 21, and dividing the distance L10 by the traveling speed of the vehicle 10.

In step S20, whether the road surface 12 is a rough road surface is judged based on the images captured by the stereo camera 21.

In other words, referring to FIG. 1A, if the height L11 of the road surface irregularity 11 becomes larger, by a predetermined amount or more, than the height L11 of the road surface irregularity 11 up until that time, the operation controller 23 may judge that the road surface 12 has become rougher than before. That is, it is judged as YES in step S20. Further, if the width L12 of the road surface irregularity 11 becomes smaller than a predetermined amount, the operation controller 23 may judge that the road surface 12 has become rougher than before. Further, the operation controller 23 may also judge that the road surface 12 has become rougher than before by satisfying both of these two conditions.

On the other hand, if the height L11 of the road surface irregularity 11 becomes smaller, by a predetermined amount or more, than the height L11 of the road surface irregularity 11 up until that time, the operation controller 23 may judge that the road surface 12 has become smoother than before. That is, it is judged as NO in step S20. Further, if the width L12 of the road surface irregularity 11 becomes larger than a predetermined amount, the operation controller 23 may judge that the road surface 12 has become smoother than before. Further, the operation controller 23 can also judge that the road surface 12 has become smoother than before by satisfying both of these two conditions.

If step S20 is YES, that is, when the uneven condition of the road surface 12 changes to rough, in step S21, the operation controller 23 increases the output of the speaker 24 and increases the volume of the canceling sound generated from the speaker 24. In this way, as a result of the uneven condition of the road surface 12 becoming rough, the road noise is adequately canceled by increasing the canceling sound even if the road noise increases.

On the other hand, if step S20 is NO, that is, when the uneven condition of the road surface 12 becomes smooth, in step S22, the operation controller 23 reduces the output of the speaker 24 and decreases the volume of the canceling sound generated from the speaker 24. In this way, as a result of the uneven condition of the road surface 12 becoming smooth, the road noise is adequately canceled by decreasing the canceling sound even if the road noise decreases.

In step S23, based on the results of steps S20, S21, and S22, the operation controller 23 learns and updates the noise-canceling database 27 based on the above-described correction result. For instance, when the road surface condition changes to rough in step S20, a combination of the rough road surface condition data and the corresponding canceling sound data are corrected or appended to the noise-canceling database 27. Similarly, when the road surface condition changes to smooth in step S20, a combination of the smooth road surface condition data and the corresponding canceling sound data are corrected or appended to the noise-canceling database 27. Then, in the next noise cancellation, road noise is canceled more effectively by using the noise-canceling database 27 updated by learning.

In step S24, the operation controller 23 outputs a canceling sound from the speaker 24 based on the increased or decreased canceling sound data in the above-described step S21 or step S22. In this manner, the road noise is adequately canceled by the canceling sound corresponding to the uneven condition of the road surface 12.

Thereafter, if the operation is to be continued, that is, if YES in step S25, the process returns to step S10 to continue the noise-canceling operation for canceling the road noise with the canceling sound appropriately adjusted according to the above-described road surface condition. On the other hand, when the operation is stopped, that is, if NO in step S25, the above-described noise-canceling operation is stopped.

In the vehicle noise canceller 20 according to the present example described above, the operation controller 23 controls the stereo camera 21 to measure the uneven condition and distance of the road surface irregularity 11 of the road surface 12, so that the canceling sound optimized, the control operation for generating the canceling sound is completed before the vehicle 10 reaches the road surface irregularity 11. In this way, cancellation noise is synchronized with the road noise, and the road noise cancellation is effectively performed in the vehicle cabin. Furthermore, since the stereo camera 21 observes the road surface irregularity 11 of the road surface and since the canceling sound suitable for the form of the road surface irregularity 11 is generated from the speaker 24, the operation controller 23 can adequately perform the road noise cancellation on the road surface irregularity 11 having various forms even when the vehicle 10 is traveling.

Furthermore, since the learning and updating of the noise-canceling database 27 is performed based on the captured images of the road surface irregularity 11 of the road surface 12 using the stereo camera 21, the noise-canceling database 27 is optimized in accordance with the road surface 12 on which the occupant routinely passes over with the vehicle 10. Therefore, by using the optimized noise-canceling database 27, the operation controller 23 generates a canceling sound from the speaker 24 so that the effect of canceling the road noise can be produced significantly.

Further, in the present example, although the stereo camera 21 is used as a road surface condition observation unit for observing the uneven condition of the road surface 12, the stereo camera 21 is also functioning to check the safety conditions ahead of the vehicle 10 which does not make the stereo camera 21 to be a discrete member of the vehicle noise canceller 20. In this regard, the cost increase of providing the vehicle noise canceller 20 in the vehicle 10 is kept down.

Although an example of the present invention has been described above, the present invention is not limited to the above example.

In the above description, the canceling sound data was selected from the database, but it is also possible to calculate canceling sound data from the road surface condition data using a conversion formula. In this case, when learning is performed in step S17 and step S23, the parameters of the conversion formula and the like may be adjusted.

Effect of the Invention

A vehicle noise canceller according to an example of the present invention includes a road surface condition observation unit for observing road surface conditions in a traveling direction of a vehicle, a speaker for generating a canceling sound for canceling road noise entering a vehicle cabin of the vehicle, and an operation controller for controlling the canceling sound generated from the speaker based on information received from the road surface condition observation unit. Therefore, since the uneven condition of the road surface is observed by the road surface condition observation unit prior to the timing of the tire of the vehicle reaching the road surface, the canceling sound corresponding to the uneven condition can be generated from the speaker without delay with respect to the noise generated by passing over the road surface, by which the occurrence of a so-called follow-up delay is prevented.

Furthermore, in the vehicle noise canceller according to the example of the present invention, the operation controller calculates the distance from the road surface irregularity to the vehicle from the conditions of the road surface observed by the road surface condition observation unit, and generates the canceling sound from the speaker in synchronization with the road noise generated by the vehicle passing over the road surface irregularity. Accordingly, shifting of the road noise and the canceling sound with respect to each other is prevented, and the road noise is adequately canceled.

Furthermore, in the vehicle noise canceller according to the example of the present invention, the road surface condition observation unit is a stereo camera, and the operation controller calculates the distance from the road surface irregularity to the vehicle from the image data captured by the stereo camera, generating the canceling sound in synchronization with the road noise generated by the vehicle passing over the road surface irregularity. Accordingly, by using the stereo camera to prevent shifting of the road noise and the canceling sound with respect to each other, the road noise is adequately canceled.

Further, the vehicle noise canceller according to the example of the present invention further includes a memory unit storing a noise-canceling database that includes a road surface condition data, indicating the conditions of the road surface, and a canceling sound data, indicating the canceling sound for canceling the road noise generated by the vehicle passing over the road surface. The operation controller selects the road surface condition data based on the conditions of the road surface observed by the road condition observation unit and generates the canceling sound from the speaker based on the noise-canceling data that corresponds to the road surface condition data selected. Thus, by using the road surface condition data and the canceling sound data stored in the storage device, the canceling sound appropriate to the road conditions can be generated.

Further, the vehicle noise canceller according to the example of the present invention is provided with an error microphone for collecting the road noise and the canceling sound, and if the condition of the road surface observed by the road surface condition observation unit changes by a predetermined amount or more, the operation controller changes the canceling sound generated by the speaker with updating the noise-canceling database based on information received from the error microphone. Accordingly, by updating the noise-canceling database based on the conditions of the road surface observed by the road condition observation unit, the noise-canceling database is made suitable to the actual road on which the vehicle passes over, which turns out increasing the effect of noise cancellation.

The invention claimed is:

1. A vehicle noise canceller, comprising:
a road surface condition observation unit configured to observe road surface conditions in a traveling direction of a vehicle;
a speaker configured to generate a canceling sound for canceling a road noise entering a vehicle cabin of the vehicle;
an operation controller configured to control the canceling sound generated from the speaker on a basis of information received from the road surface condition observation unit,
wherein the information comprises a size of a road surface irregularity in the traveling direction of the vehicle and a distance of the road surface irregularity from the vehicle,
wherein the operation controller calculates a time lag from when an image of the road surface irregularity is captured by the road surface condition observation unit to when the vehicle comes into a contact with the road surface irregularity, and
wherein the operation controller generates the canceling sound from the speaker, based on canceling sound data selected from pre-stored information on the road surface conditions, when the time lag that is calculated has passed after capturing the image of the road surface;
an error microphone configured to collect the road noise and the canceling sound; and
a memory unit configured to store a noise-canceling database that includes road surface condition data and the canceling sound data,
wherein, when the conditions of the road surface observed by the road surface condition observation unit changes by a predetermined amount or more, the operation controller changes the canceling sound to be generated by the speaker with updating the noise-canceling database on a basis of information received from the error microphone.

2. The vehicle noise canceller according to claim 1, wherein the operation controller is configured to calculate the distance from the road surface irregularity to the vehicle from the conditions of the road surface observed by the road surface condition observation unit, and to generate the canceling sound from the speaker in synchronization with the road noise generated by the vehicle passing over the road surface irregularity.

3. The vehicle noise canceller according to claim 1, wherein the road surface condition observation unit comprises a stereo camera, and
wherein the operation controller is configured to calculate the distance from the road surface irregularity to the vehicle from image data captured by the stereo camera, and to generate the canceling sound in synchronization with the road noise generated by the vehicle passing over the road surface irregularity.

4. The vehicle noise canceller according to claim 2, wherein the road surface condition observation unit comprises a stereo camera, and
wherein the operation controller is configured to calculate the distance from the road surface irregularity to the vehicle from image data captured by the stereo camera, and generate the canceling sound in synchronization with the road noise generated by the vehicle passing over the road surface irregularity.

5. The vehicle noise canceller according to claim 1,
the road surface condition data indicating the conditions of the road surface, the canceling sound data indicating the canceling sound for canceling the road noise generated by the vehicle passing over the road surface,
wherein the operation controller is further configured to select the road surface condition data on a basis of the conditions of the road surface observed by the road condition observation unit, and to generate the canceling sound from the speaker on a basis of the noise-canceling data that corresponds to the road surface condition data selected.

6. The vehicle noise canceller according to claim 2,
the road surface condition data indicating the conditions of the road surface, the canceling sound data indicating the canceling sound for canceling the road noise generated by the vehicle passing over the road surface,
wherein the operation controller is further configured to select the road surface condition data on a basis of the conditions of the road surface observed by the road condition observation unit, and to generate the canceling sound from the speaker on a basis of the noise-canceling data that corresponds to the road surface condition data selected.

7. The road surface condition data indicating the conditions of the road surface, the canceling sound data indicating the canceling sound for canceling the road noise generated by the vehicle passing over the road surface,
wherein the operation controller is further configured to select the road surface condition data on a basis of the conditions of the road surface observed by the road condition observation unit, and to generate the canceling sound from the speaker on a basis of the noise-canceling data that corresponds to the road surface condition data selected.

8. The road surface condition data indicating the conditions of the road surface, the canceling sound data indicating the canceling sound for canceling the road noise generated by the vehicle passing over the road surface,
wherein the operation controller is further configured to select the road surface condition data on a basis of the conditions of the road surface observed by the road condition observation unit, and to generate the canceling sound from the speaker on a basis of the noise-canceling data that corresponds to the road surface condition data selected.

9. The vehicle noise canceller according to claim 1, wherein the information received from the road surface condition observation unit further comprises a shape of the road surface irregularity.

10. The vehicle noise canceller according to claim 1, wherein the information about the size of the road surface irregularity, which is received from the road surface condition observation unit for controlling the canceling sound, comprises a height of the road surface irregularity.

11. The vehicle noise canceller according to claim 10, wherein the information about the size of the mad surface irregularity, which is received from the road surface condition observation unit for controlling the canceling, further comprises a width of the road surface irregularity.

12. The vehicle noise canceller according to claim 1, wherein the information about the size of the road surface irregularity, which is received from the road surface condition observation unit for controlling the canceling, comprises a width of the road surface irregularity.

13. The vehicle noise canceller according to claim 1, wherein the operation controller calculates the time lag based on a speed of the vehicle and the distance of the road surface irregularity from the vehicle.

14. The vehicle noise canceller according to claim 1, further comprising an acceleration sensor measuring an acceleration acting on the vehicle,
wherein the operation controller generates the canceling sound further based on the acceleration received from the acceleration sensor.

* * * * *